United States Patent [19]

Nakajima

[11] 4,444,483

[45] Apr. 24, 1984

[54] CONTROL CIRCUIT FOR POWER SUPPLY ASSOCIATED WITH AN ELECTRONIC FLASH UNIT

[75] Inventor: Yukio Nakajima, Hachioji, Japan

[73] Assignee: Olympus Optical Company, Ltd., Japan

[21] Appl. No.: 302,756

[22] Filed: Sep. 16, 1981

[30] Foreign Application Priority Data

Nov. 10, 1980 [JP] Japan .................................. 55-157897

[51] Int. Cl.³ .............................................. G03B 15/05
[52] U.S. Cl. .................................. 354.1/128; 354/145.1
[58] Field of Search ................. 354/60 E, 60 L, 60 F, 354/126–128, 139, 145, 149, 289

[56] References Cited

U.S. PATENT DOCUMENTS 3,916,424 10/1975 Prochnow ............................ 354/149
4,001,640 1/1977 Biber ................................ 354/145 X
4,007,469 2/1977 Land et al. ....................... 354/128 X
4,281,917 8/1981 Kitagawa et al. ................. 354/60 E

FOREIGN PATENT DOCUMENTS 45-5342 2/1970 Japan .................................. 354/149

Primary Examiner—William B. Perkey
Attorney, Agent, or Firm—Ostrolenk, Faber, Gerb & Soffen

[57] ABSTRACT

A control circuit for a power supply associated with an electronic flash unit prevents a wasteful power dissipation of a power supply cell which is internally housed within an electronic flash unit, by automatically interrupting the operation of a voltage booster contained within the electronic flash unit in response to an output from a timer circuit which is internally housed within photographic camera whenever the camera is not operated over a given time interval.

8 Claims, 4 Drawing Figures

4,444,483

CONTROL CIRCUIT FOR POWER SUPPLY ASSOCIATED WITH AN ELECTRONIC FLASH UNIT

BACKGROUND OF THE INVENTION

The invention relates to a control circuit for a power supply associated with an electronic flash unit. More particularly, the invention relates to such control circuit which utilizes a timer circuit of a photographic camera with which the electronic flash unit is associated to automatically deactivate a voltage booster of a power supply for the unit whenever the electronic flash is left in its operative condition over a given time interval, thereby suppressing the dissipation of a battery or cell which is used as a power supply.

As is well recognized, an ordinary electronic flash unit which is internally housed within or mounted on a photographic camera utilizes a dry cell of a low electromotive force as a power supply. For this reason, the supply voltage is stepped up by a voltage booster formed by a DC-DC converter before it is supplied to a flashlight illumination circuit. In the flashlight illumination circuit, the booster voltage charges a main capacitor of an increased capacity, the voltage across which is then applied to a flash discharge tube to activate it in response to a shutter release operation.

An electronic flash unit includes a power switch which is connected between a power cell and a voltage booster and which is turned on to initiate the operation of the booster whenever the electronic flash unit is to be used. The purpose of such arrangement is to avoid a power dissipation of cell which would occur sooner if the booster circuit was normally left in its operative condition. However, a user of a photographic camera with which the electronic flash unit is associated is likely to forget to operate the power switch. If the switch is left on, the cell will be rapidly exhausted, preventing an effective operation of the electronic flash unit. Also, the power switch may be inadvertently turned on thereby permitting a wasteful dissipation of the cell as a result of an oversight.

Recent photographic cameras contain a variety of electrical controls, and are designed to achieve a saving in the power dissipation by utilizing a timer circuit which operates to disconnect an internally housed cell, even though the main switch remains closed, to prevent a wasteful dissipation of the cell unless a given operation is tried within a given time interval after the main switch has been closed. By way of example, a display of exposure information within the viewfinder by light emitting diodes will be automatically interrupted unless a next scheduled operation is tried within a given time interval determined by a timer circuit. In other words, recent photographic cameras containing a variety of electrical controls include a timer circuit which produces time limit signals of given lengths for the purpose of suppressing the power dissipation of the supply cell.

SUMMARY OF THE INVENTION

It is an object of the invention to provide a control circuit for a power supply associated with an electronic flash unit which minimizes wasteful dissipation of a supply cell by controlling the operation of a voltage booster contained within the electronic flash unit in response to an output from a timer circuit that is internally housed within an associated photographic camera.

In accordance with the invention, an output from a timer circuit, which is internally housed within an associated photographic camera, is utilized to control a voltage booster contained in an electronic flash unit, thereby eliminating the need for a number of parts which would be required if a separate timer circuit is provided within the electronic flash unit. This also avoids an increased size of the electronic flash unit while achieving an automatic interrupt function with a simple arrangement.

A time limit signal from the timer circuit which is internally housed within a camera may be transmitted to the electronic flash unit through a terminal which is already present in the existing electronic flash unit to transmit a signal indicative of the completion of a charging operation. In this manner, an increase in the number of terminals is avoided to provide a connection between the camera and the electronic flash unit while allowing an automatic interruption of the electronic flash unit in response to an output from the timer circuit contained within the camera.

DESCRIPTION OF PREFERRED EMBODIMENTS

Figure 1:
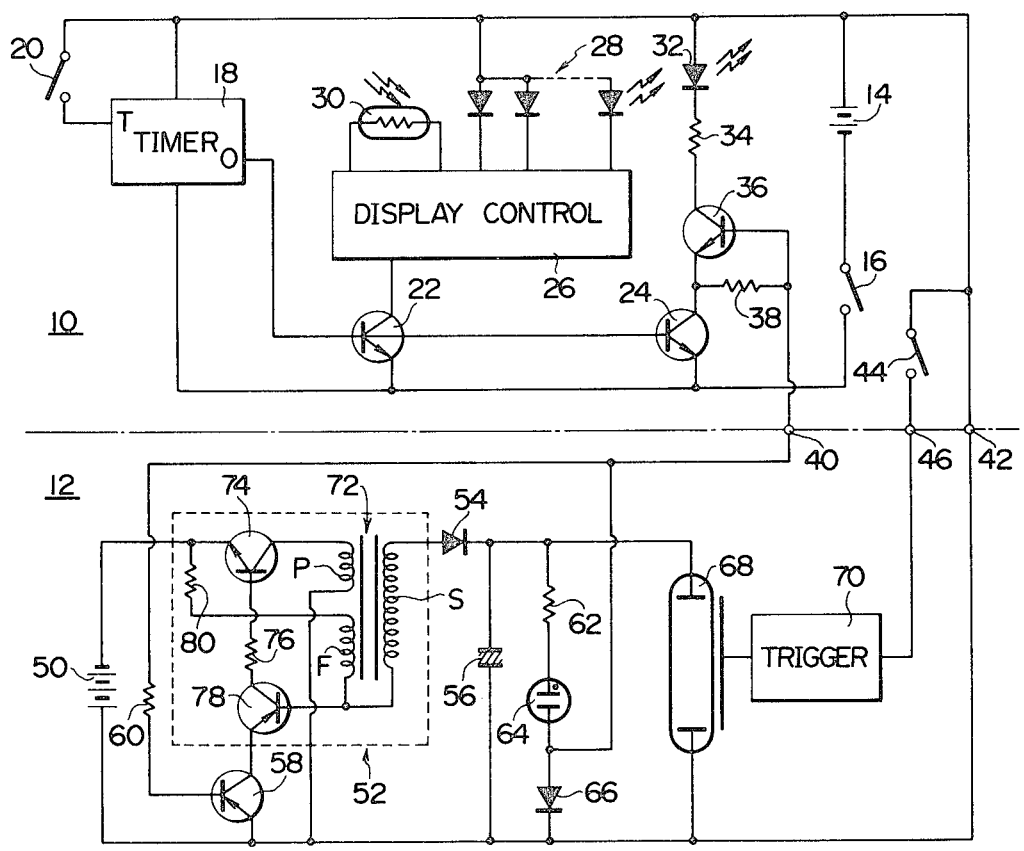
FIG. 1 is a circuit diagram of a control circuit for a power supply associated with an electronic flash unit accordng to one embodiment of the invention.

FIG. 1 shows a control circuit for a power supply associated with an electronic flash unit according to one embodiment of the invention. In this Figure, a horizontal phantom line is drawn centrally, and it is to be understood that an electrical circuit shown above the phantom line represents an electrical circuit disposed within a photographic camera 10 while that shown below the phantom line represents an electrical circuit disposed within an electronic flash unit 12. A control circuit for a power supply of the invention essentially comprises a timer circuit 18 which is disposed within the camera 10, a voltage booster 52 disposed within the electronic flash unit 12, and a switching transistor 58 which is disposed within the electronic flash unit 12 and functioning as a power switch for the voltage booster 52.

The timer circuit 18 is connected across a power cell 14 internally housed within the camera 10 and acting as a power supply, through a main switch 16 which is provided on the part of the camera 10. The timer circuit 18 includes a trigger signal terminal T which is connected to the positive terminal of power cell 14 through a normally open display enable switch 20. In response to the closure of the switch 20, a trigger signal of a high level is applied to the terminal T of the timer circuit, which produces a high level output at its output terminal O which is maintained for a given time interval, for example, for several tens of seconds after the closure of the switch 20 and which returns to a low level after such time interval. If the switch 20 is turned on again before the time interval passes, the timer circuit 18 is reset and a new time interval is initiated by resetting a count corresponding to the time interval. Consequently, the high level output is maintained until the timer counts out.

The output terminal O of the timer circuit 18 is connected to the base of an NPN switching transistor 22, which has its emitter connected to the negative terminal of the cell 14 through the main switch 16 and has its collector connected to a display control circuit 26. In this manner, the transistor 22 operates as the power switch for the display control circuit 26. A photometric, light receiving element 30 has its opposite terminals connected to the display control circuit 26, and a plurality of light emitting diodes 28, which are utilized to provide display of exposure information such as a shutter speed or the like within a viewfinder of the camera 10, for example, has their cathodes connected to the control circuit 26. The diodes 28 have their anodes connected in common with the positive terminal of the power cell 14. The display control circuit 26 functions to provide a display of information by a selective illumination of diodes 28 in response to an output from the photometric element 30.

The output terminal O of the timer circuit 18 is also connected to the base of an NPN switching transistor 24, which has its emitter connected to the negative terminal of power cell 14 through the main switch 16 and has its collector connected through a resistor 38 to a terminal 40 and also connected to the emitter of an NPN switching transistor 36. The terminal 40 is utilized to transmit a signal indicative of the completion of a charging operation. The transistor 36 has its base connected to the terminal 40 and its collector connected through a resistor 34 to the cathode of a light emitting diode 32 which has its anode connected to the positive terminal of the cell 14. The diode 32 is used to indicate the completion of a charging operation of a main capacitor 56, disposed within the electronic flash unit 12, within the viewfinder of the camera 10. It will be noted that the positive terminal of power cell 14 is also connected to a terminal 42 which represents the common ground connection, and is also connected through a synchro contact 44 to a terminal 46.

The electronic flash unit 12 includes a voltage booster 52 formed by a DC-DC converter of a known form which comprises a blocking oscillator. The oscillator comprises an oscillation transformer 72 having a primary winding P, a secondary winding S and a feedback winding F; an NPN oscillation transistor 74 having its collector connected to one end of the primary winding P and its emitter connected to the negative terminal of a cell 50 which is disposed within the electronic flash unit 12; a PNP feedback transistor 78 having its base connected to one end of the feedback winding F and its collector connected through a resistor 76 to the base of the transistor 74; and resistor 80 connected between the other end of the feedback winding F and the emitter of the transistor 74. The emitter of the transistor 78 is connected to the collector of a PNP switching transistor 58, which has its emitter connected to the positive terminal of the cell 50 and its base connected through a resistor 60 to the terminal 40. The other end of the primary winding P is connected to the positive terminal of power cell 50. Finally, one end of the secondary winding S is connected to said one end of the feedback winding F while its other end is connected to the anode of a rectifier diode 54.

The transistor 58 functions as a power switch, and when it is turned on, an emitter-collector current flows through the transistor 58 and the transistor 78 to supply a base current to the transistor 74, whereby an amplified collector current is produced which excites the primary winding P of the oscillation transformer 72, developing an induced voltage across the feedback winding F. The induced voltage is of a polarity to increase the base current to the transistor 78, whereby its collector current increases. This in turn increases the base current to the transistor 74, resulting in an increase in the collector current thereof. This cyclic process continues until the collector current of the transistor 74 is prevented from increasing by a saturation resistance of the transistor 74 and a d.c. resistance of the primary winding P, whereupon the induced voltage across the feedback winding F begins to decrease. Once the base current begins to decrease, the collector current also begins decreasing, by a process which is opposite to the collector current increasing process, whereby the both transistors 74, 78 are rapidly driven to their cut-off condition. When the both transistors 74, 78 are cut off, a back e.m.f. is developed across the primary winding P and the feedback winding F to charge the distributed capacitance of the respective windings. As a result of such charging of the distributed capacitances, an oscillating voltage is developed across the feedback winding F, and after one-half period of the oscillating voltage, the base of the transistor 78 is again driven to the negative polarity, allowing the collector current of the transistor 78 to reinitiate. This brings the circuit condition to the initial status, thus sustaining the oscillation. When the oscillation is sustained on the primary side of this manner, an induced voltage which is boosted or stepped up to a high voltage on the order of 200 to 300 V is developed across the secondary winding S of the transformer 72, and is rectified by the diode 54 to be supplied to the flashlight illumination circuit within the electronic flash unit 12.

The flashlight illumination circuit essentially comprises a main capacitor 56, neon lamp 64 which is used to indicate the completion of a charging operation, a flash discharge tube 68, and a trigger circuit 70 associated with the discharge tube. The main capacitor 56 has its one end connected to the cathode of the rectifier diode 54 and its other end connected to the positive terminal of the cell 50. The neon lamp 64 has its one end connected to the cathode of the rectifier diode 54 through a resistor 62 and its other end connected to the positive terminal of power cell 50 through a forwardly poled diode 66 which is connected to prevent a reverse current flow. In addition, the junction between the neon lamp 64 and diode 66 is connected to the terminal 40. The discharge tube 68 has its one end connected to the cathode of the rectifier diode 54 and its other end connected to the positive terminal of the cell 50. The discharge tube includes a trigger electrode which is connected to the output terminal of the trigger circuit 70. The trigger circuit 70 has its input terminal connected to the terminal 46. It will be noted that the positive terminal of the cell 50 is also connected to the terminal 42 which represents the common ground connection.

In operation, when the main switch 16 of the camera 10 is closed and then the display enable switch 20 is closed, a high level signal is applied to the input of the timer circuit 18, which therefore outputs a high level signal at its output terminal O. This output signal turns the switching transistor 22 on, allowing the operating voltage to be supplied to the display control circuit 26 to activate it. The display control circuit 26 then operates to cause a selective illumination of light emitting diodes 28 by driving the cathode of either one of the diodes 28 to a low level in accordance with a photometric output from the photometric element 30. In this manner, exposure information is displayed optically within the viewfinder of the camera 10. The output signal of a high level from the output terminal 0 of the timer circuit 18 also turns the transistor 24 on, which then operates through the resistor 38 or the base-emitter path of the transistor 36 to bring the terminal 40 to a potential which is lower than the potential of the ground terminal 42 by an amount corresponding to the e.m.f. of power cell 14. As a result of the terminal 40 assuming a potential which is lower than that of the terminal 42, a current flow is enabled through a path including the emitter-base path of the switching transistor 58 and the resistor 60, thus turning transistor 58 on. This initiates the booster operation of the voltage booster 52. It is to be noted that the base current to the transistor 58 is limited by the resistor 60 and cannot pass through the base-emitter path of the transistor 36 contained within the camera 10, but pass through the resistor 38. This prevents the transistor 36 from being turned on, and hence the light emitting diode 32 cannot yet be energized for illumination.

The main capacitor 56 begins to be charged as a result of the operation of the voltage booster 52, and when the voltage developed thereacross reaches a value which allows an illumination of the discharge tube 68, the neon lamp 64 becomes illuminated, indicating the completion of a charging operation on the part of the electronic flash unit 12. Since the terminal 40 assumes a potential which is lower than the potential of the terminal 42, the current flow through the neon lamp 64 follows a path including the terminal 40, base-emitter path of the transistor 36 and the collector-emitter path of the transistor 24, thus turning the transistor 36 on. As a consequence, a current flow is enabled through the light emitting diode 32 to enable an illumination thereof, thus indicating the completion of a charging operation within the electronic flash unit 12, through the viewfinder of the camera 10.

When a charging operation within the electronic flash unit 12 is completed, a flash photography by means of the camera 10 is enabled, so that a user of the camera may direct the camera 10 toward an object being photographed and depress a shutter release button, not shown. Thereupon, a shutter, not shown, is operated, and the synchro contact 44 is closed in synchronism with the full opening of the shutter to apply a high voltage to the trigger electrode through the trigger circuit 70, thus triggering a flashlight illumination from the discharge tube 48. A flash photography is thus achieved.

When a user ceases a photographing operation (i.e. does not close the switch 20), and a given time interval passes after the termination of closure of the display enable switch 20 within the camera 10, the output terminal 0 of the timer circuit 18 reverts from its high to its low level, thus turning the transistors 22, 24 off. The display control circuit 26 is no longer activated, and the display of exposure information in terms of selected light emitting diode 28 ceases. Also, the light emitting diode 32 ceases to be illuminated, thus ceasing to indicate the completion of a charging operation. Hence, if the main switch 16 remains closed, the display is automatically interrupted after a given time interval, avoiding a wasteful power dissipation of power cell 14 which is contained within the camera 10. Simultaneously, as the transistor 24 is turned off, the transistor 58 within the electronic flash unit 12 is also turned off to interrupt the connection of power cell 50 with the voltage booster 52, which therefore ceases to operate. In this manner, a wasteful power dissipation of power cell 55 which is contained within the electronic flash unit 12 is also avoided. It will be noted that since the switching transistor 58 is connected in the feedback loop of the voltage booster 52, the emitter-collector current of the transistor 58 has a reduced magnitude, and the power dissipation of power cell 50 is eliminated whenever the transistor 58 is turned off.

Figure 2:
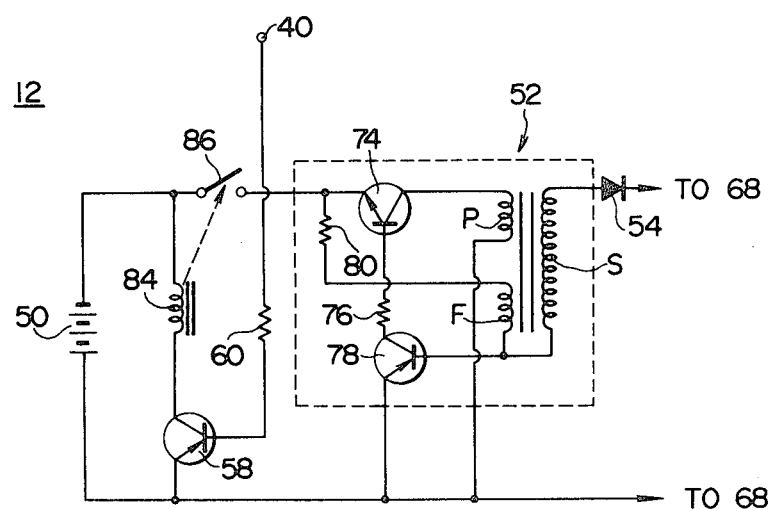
FIG. 2 is a circuit diagram of part of a similar control circuit according to another embodiment of the invention.

FIG. 2 shows part of a control circuit for a power supply associated with an electronic flash unit according to another embodiment of the invention. As compared with the embodiment shown in FIG. 1 in which the transistor 58 is directly utilized as a power switch for the voltage booster 52, in the present embodiment, the transistor 58 may be turned on and off to control a relay 84 having a relay contact which serves as a power switch 86 of the electronic flash unit 12. Specifically, a series combination of the relay 84 and the transistor 58 is connected in shunt with power cell 50, and the power switch 86 is connected between the junction between the relay 84 and the negative terminal of power cell 50 and the emitter of the transistor 74 so as to be closed only when the relay 84 is energized. The emitter of the transistor 78 is directly connected to the positive terminal of power cell 50. In other respects, the arrangement is completely similar to that shown in FIG. 1, and hence the corresponding parts are designated by like reference numerals without repeating their description.

In this arrangement, when a user of the photographic camera ceases to close the display enable switch 20 (see FIG. 1) of the camera 10 and a given time interval passes, the timer circuit 18 (see FIG. 1) functions to turn the transistor 24 off, whereby the transistor 58 is also turned off. As a result, the relay 84 is deenergized, opening the power switch 86, thus preventing a wasteful power dissipation of the cell 50 which is contained within power electronic flash unit 12.

Figure 3:
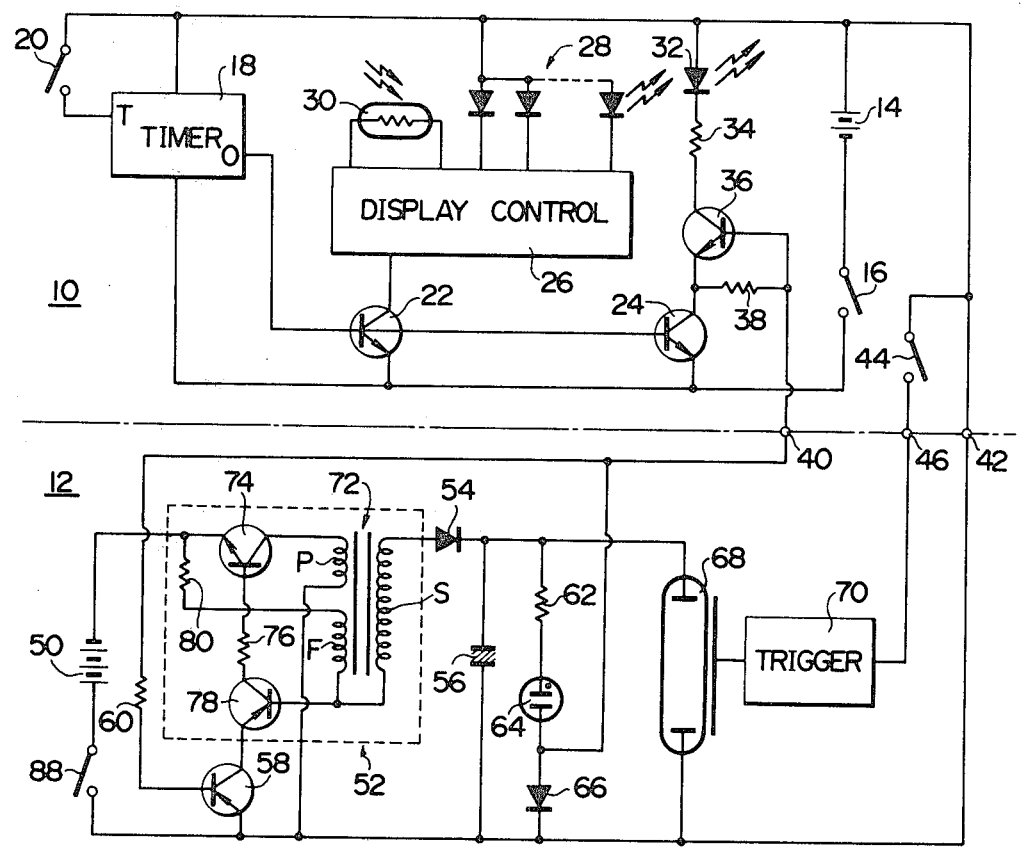
FIG. 3 is a circuit diagram of a similar control circuit according to a further embodiment of the invention.

FIG. 3 shows a control circuit for a power supply associated with an electronic flash unit according to a further embodiment of the invention which is generally similar to the circuit arrangement of FIG. 1 except that a main switch 88 within the electronic flash unit 12 is added. Specifically, the main switch 88 is connected between the positive terminal of the cell 50 within power electronic flash unit 12 and the emitter of the switching transistor 58. In the arrangement of FIG. 1, when the electronic flash unit 12 is mounted on the camera 10 and the main switch 16 and the display enable switch 20 are closed, the electronic flash unit 12 is also activated. However, the provision of the main switch 88 permits a selection between "in-service" and "out-of-service" status of the unit 12 under such condition.

More specifically, in the present embodiment, when the electronic flash unit 12 is mounted on the camera 10, the switch 88 may be thrown to its open or its closed position to enable either a flash photography or a non-flash photography. When non-photography is chosen, the voltage booster 52 is deactivated, thus further reducing the power dissipation of power cell 50 as compared with the circuit arrangement of FIG. 1. Thus, when the main switch 88 is turned off, the emitter of the transistor 58 cannot be connected with the positive terminal of power cell 50, so that if the main switch 16 and the display enable switch 20 on the part of the camera 10 are closed, the transistor 58 cannot be turned on, to prevent the activation of the voltage booster 52. In other words, a non-flash photography is chosen. The operation of the circuit arrangement when the main switch 88 is turned on is quite similar to that described above in connection with FIG. 1, and therefore will not be described again.

Figure 4:
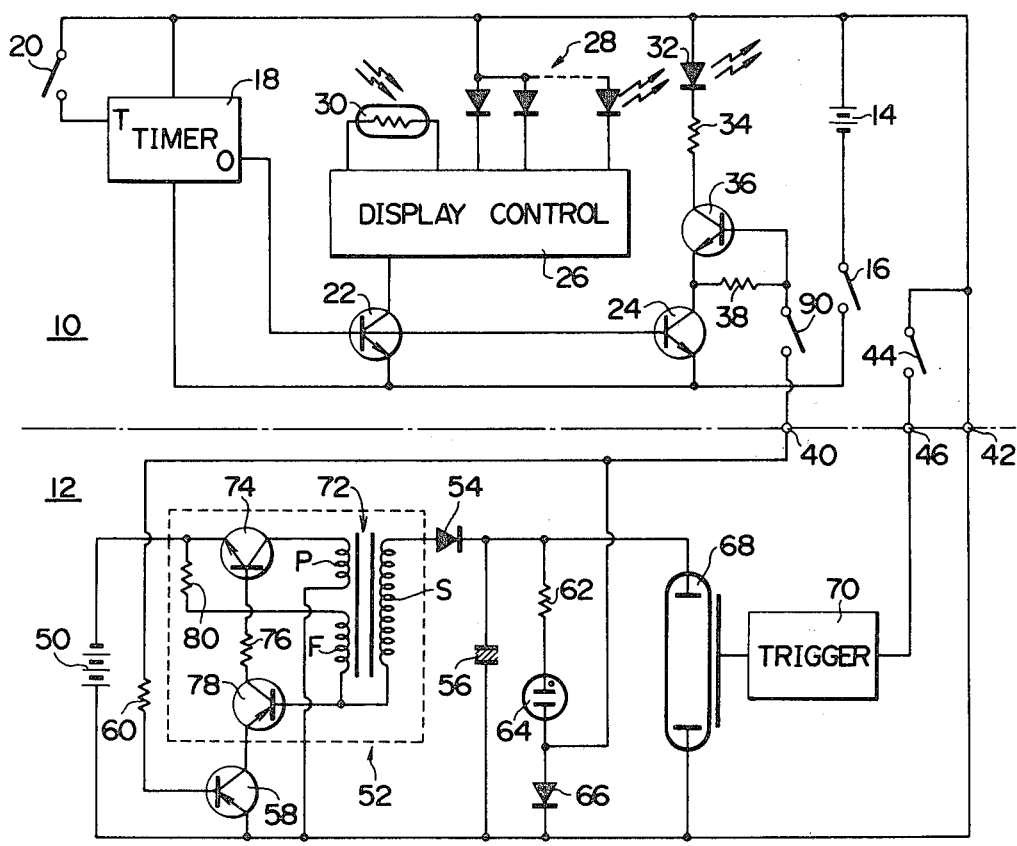
FIG. 4 is a circuit diagram of a similar control circuit according to still another embodiment of the invention.

FIG. 4 shows a control circuit for a power supply associated with an electronic flash unit according to still another embodiment of the invention in which the function of the main switch 88 shown in FIG. 3 is replaced by a photographing mode changeover switch 90 which is disposed within the camera 10. Specifically, the photographing mode changeover switch 90 is connected between the junction between the base of the transistor 36 and the resistor 38 and the terminal 40 within the camera 10. In other respects, the circuit arrangement is quite similar to that shown in FIG. 1.

In the present embodiment, when the photographing mode changeover switch 90 is closed, a flash photography is enabled, and the operation is quite similar to that described previously in connection with FIG. 1. However, if the camera 10 is not operated, the operation of the voltage booster 52 located within the electronic flash 12 is automatically interrupted after a given time interval. When the photographing mode changeover switch 90 is opened, a non-flash photography is enabled by disconnecting the circuit connection with the base of the transistor 18 and preventing it from being turned on. As will be recognized, the voltage booster 52 is not activated during a non-flash photography, thus preventing a wasteful power dissipation of power cell 50.

In the described embodiments, the timer circuit utilized is one which automatically interrupts the display of exposure information within the viewfinder, but any other timer circuit which is disposed within the camera for other purposes may be utilized for the purpose of the invention.

In addition, while the display enable switch which activates the timer circuit comprises a mechanical normally open switch, it should be understood that in practice, a semiconductor switch or the like may be conveniently used which becomes conductive upon contact with the shutter release button of a finger or user of the camera, for example.

The application of the invention has been described above in an environment where a photographic camera and an electronic flash unit are separate from each other and their electrical circuits are interconnected through a plurality of connection terminals. However, it should be understood that the invention is equally applicable to an photographic camera which internally houses an electronic flash unit.

What is claimed is:

1. Apparatus comprising:
    (A) a camera having an operating switch which initiates an operating mode of said camera when said switch is enabled;
    (B) an electronic flash unit associated with said camera and including a voltage booster for boosting the power output of a power cell to feed a flash illumination circuit of said flash unit;
    (C) a control circuit including:
        (1) a timer circuit located in said camera for producing at least one time limit signal having a predetermined duration responsive to the enabling of said operating switch; and
        (2) a switching element located in said electronic flash unit for activating said voltage booster in response to a time limit signal derived from said timer circuit;
    and
    (D) means for displaying exposure information responsive to a time limit signal derived from said timer circuit.

2. Apparatus according to claim 1, in which said switching element connects said voltage booster with said power cell whenever said switching element is turned on by said time limit signal.

3. Apparatus according to claim 2, in which said voltage booster comprises a blocking oscillator and said switching element is connected in a feedback path of said blocking oscillator.

4. Apparatus according to claim 1, in which said switching element is connected with a relay which operates to open or close a power switch connecting said voltage booster to said power cell, thereby controlling the energization of said relay to control the supply of power to said voltage booster.

5. Apparatus according to claim 1, wherein said switching element activates said voltage booster only during the duration of said time limit signal.

6. Apparatus, comprising:
    (A) a camera having an operating switch which initiates an operating mode of said camera when said switch is enabled;
    (B) an electronic flash unit associated with said camera and including a voltage booster for boosting the power output of a power cell to feed a flash illumination circuit of said flash unit;
    (C) a control circuit including:
        (1) a timer circuit located in said camera for producing a time limit signal having a predetermined duration responsive to the enabling of said operating switch;
    and
        (2) a switching element located in said electronic flash unit for activating said voltage booster in response to said time limit signal;
    (D) said switching element being connected to said power supply cell through a main power switch of said electronic flash unit, and being disabled whenever said main power switch is turned off.

7. Apparatus, comprising:
    (A) a camera having an operating switch which initiates an operating mode of said camera when said switch is enabled;
    (B) an electronic flash unit associated with said camera and including a voltage booster for boosting the power output of a power cell to feed a flash illumination circuit of said flash unit;
    (C) a control circuit including:
        (1) a timer circuit located in said camera for producing a time limit signal having a predetermined duration responsive to the enabling of said operating switch;
    and
        (2) a switching element located in said electronic flash unit for activating said voltage booster in response to said time limit signal;
    (D) said switching element being connected with a photographing mode changeover switch which is disposed with said camera, and wherein said switching element is disabled whenever said changeover switch is placed in a position corresponding to a non-flash photographing mode.

8. Apparatus, comprising:
(A) a camera having an operating switch which initiates an operating mode of said camera when said switch is enabled;
(B) an electronic flash unit associated with said camera and including a voltage booster for boosting the power output of a power cell to feed a flash illumination circuit of said flash unit;
(C) a control circuit including:
  (1) a timer circuit located in said camera for producing a time limit signal having a predetermined duration responsive to the enabling of said operating switch; and
  (2) a switching element located in said electronic flash unit for activating said voltage booster in response to said time limit signal;
(D) said flash illumination circuit including a main charging capacitor;
(E) a terminal at an interface between said camera and said flash unit;
(F) means in said flash unit for applying a charge signal to said terminal indicating that said main charging capacitor has been charged; and
(G) said switching element receiving said time limit signal from said timer circuit via said terminal.

* * * * *